US008468534B2

(12) United States Patent
Tunning

(10) Patent No.: US 8,468,534 B2
(45) Date of Patent: Jun. 18, 2013

(54) DYNAMIC PRIORITY QUEUING

(75) Inventor: Brian R. Tunning, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 440 days.

(21) Appl. No.: 12/754,442

(22) Filed: Apr. 5, 2010

(65) Prior Publication Data

US 2011/0246996 A1 Oct. 6, 2011

(51) Int. Cl.
*G06F 9/46* (2006.01)
(52) U.S. Cl.
USPC ............. 718/103; 718/102; 711/169; 712/28; 712/29; 712/30; 712/31
(58) Field of Classification Search
None
See application file for complete search history.

(56) References Cited

U.S. PATENT DOCUMENTS

| | | | |
|---|---|---|---|
| 6,658,485 B1 * | 12/2003 | Baber et al. | 719/314 |
| 8,090,943 B1 * | 1/2012 | Tran | 713/167 |
| 2005/0256907 A1 * | 11/2005 | Novik et al. | 707/200 |
| 2009/0172399 A1 * | 7/2009 | Schmid | 713/168 |
| 2010/0309436 A1 * | 12/2010 | Allen et al. | 353/21 |

* cited by examiner

*Primary Examiner* — Emerson Puente
*Assistant Examiner* — Sisley Kim
(74) *Attorney, Agent, or Firm* — Fish & Richardson P.C.

(57) ABSTRACT

Techniques are provided for dynamically re-ordering operation requests that have previously been submitted to a queue management unit. After the queue management unit has placed multiple requests in a queue to be executed in an order that is based on priorities that were assigned to the operations, the entity that requested the operations (the "requester") sends one or more priority-change messages. The one or more priority-change messages include requests to perform operations that have already been queued. For at least one of the operations, the priority assigned to the operation in the subsequent request is different from the priority that was assigned to the same operation when that operation was initially queued for execution. Based on the change in priority, the operation whose priority has change is placed at a different location in the queue, relative to the other operations in the queue that were requested by the same requester.

24 Claims, 5 Drawing Sheets

DYNAMIC PRIORITY QUEUING

FIELD OF THE INVENTION

The present invention relates to execution of operations within a computing device and, more specifically, to dynamically changing the priority of operations that have already been queued for execution.

BACKGROUND

Computer programs often request several operations to be performed in response to a single event. For example, when a user of a photo management application requests to view a page of 100 photos, the photo management application will typically respond by requesting execution of 100 image retrieval operations.

Frequently, computing resources are not available to perform all of the desired operations at once. For example, a device with a single core processor would not be able to perform the 100 image retrieval operations in parallel. Consequently, it is common in these situations for computer programs to respond to events by placing multiple operation requests in a queue. Once the operation requests have been placed in a queue, the computing device executes the operations in a sequence that is dictated by the position of the operation requests within the queue, as processing resources become available.

In a system that queues operation requests, the order in which the requests are queued may have an enormous effect on the user experience. For example, assume that a user is using a device that is only able to display ten images at a time. If the retrieval requests for the first ten images of the 100 photo page are placed in the queue ahead of the other retrieval requests for the other 90 images, then the user will see the screen quickly fill with images. On the other hand, if the retrieval requests for the first ten images are placed in the queue after the retrieval requests for the other 90 images, a long time may lapse before the user sees any images at all.

To ensure the best user experience, computer programs can assign priorities to the operations that they request. These priorities may be passed to the process that is responsible for managing the queue (the "queue management unit") along with the operation requests to which the priorities correspond. For example, the photo management application may indicate that the first ten photos are "high" priority, while the remaining 90 photos are "low" priority. Based on the priority information, the queue management unit would place the high priority operation requests for the first 10 photos ahead of the low priority operation requests for the other 90 photos.

Unfortunately, even when priorities are provided to the queue management unit, inefficiencies may occur if there are significant delays between when any operation request is placed in the queue, and when the operation request is executed. The length of such delays is based on the number of operations in the queue, the resource requirements of the operation, and the resources available on the device. For example, if 100 over-the-network image retrieval requests are placed in a queue, the images are extremely high resolution, and the network connection speed is very slow, then there will be a long delay between when the requests are placed in the queue and when the 100$^{th}$ photo is finally downloaded and displayed.

When significant delays occur between when an operation request is queued for execution and when the operation is executed, the order of the operation requests within the queue may cease to reflect the desires of a user. For example, assume that after the 100 image retrieval operations have been queued, the user scrolls to the bottom of the 100 image page. The requests for the last 10 images may be at the very end of the queue (since they would have had the lowest priority at the time that the operation requests were submitted by the photo management application to the queue management unit). Consequently, the user may have to wait for the preceding 90 photos to be retrieved before the user begins to see the final 10 images.

One approach to avoiding the negative user experiences caused by such delays is to decrease the number of requests that computer programs send to the queue management unit at any given time. For example, rather than send operation requests to retrieve 100 images on a page, the photo management application may split the 100 image page into ten 10 image pages. Using this approach, each request will only be for 10 images at a time. Thus, if the user requests the last 10 images, retrieval of those 10 images will be requested without placing requests for the 90 other images into the queue.

Unfortunately, changing a program to reduce the number of operation requests that are submitted to the queue management unit also has drawbacks. For example, some users may want to have 100 images per page, rather than ten 10 image pages. Further, it is often preferable for a requesting program to submit a large number of operation requests to the queue management system so that, after performing the high priority operations, the device can start on the low priority operations rather than simply going idle.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for dynamically re-ordering operation requests that have previously been submitted to a queue management unit. After the queue management unit has placed multiple requests in a queue to be executed in an order that is based on priorities that were assigned to the operations, the entity that requested the operations (the "requester") sends one or more priority-change messages. The one or more priority-change messages include new priorities for operations that have already been queued. For at least one of the operations, the new priority assigned to the operation in the priority-change messages is different from the priority that was assigned to the same operation when that operation was initially queued for execution. Based on the change in priority, the operation whose priority has change is placed at a different location in the queue, relative to the other operations in the queue that were requested by the same requester.

By allowing the priority and position of operations to be changed within the queue after the operations have been placed in the queue, the requesters can account for events that occur between when the operations are initially requested, and when the operations are actually executed. For example, if some user interaction with an application indicates a change in a user's priorities (e.g. the user scrolls to the last 10 images of a 100 image page), then the application can change the priorities of the 100 image retrieval operations even though the operations have already been queued by the queue management unit. This allows applications to submit requests in relatively large batches (e.g. retrieve 100 images) without incurring a significant penalty when the priorities of the user change after the requests are submitted.

Queuing Operation Requests

Figure 1:
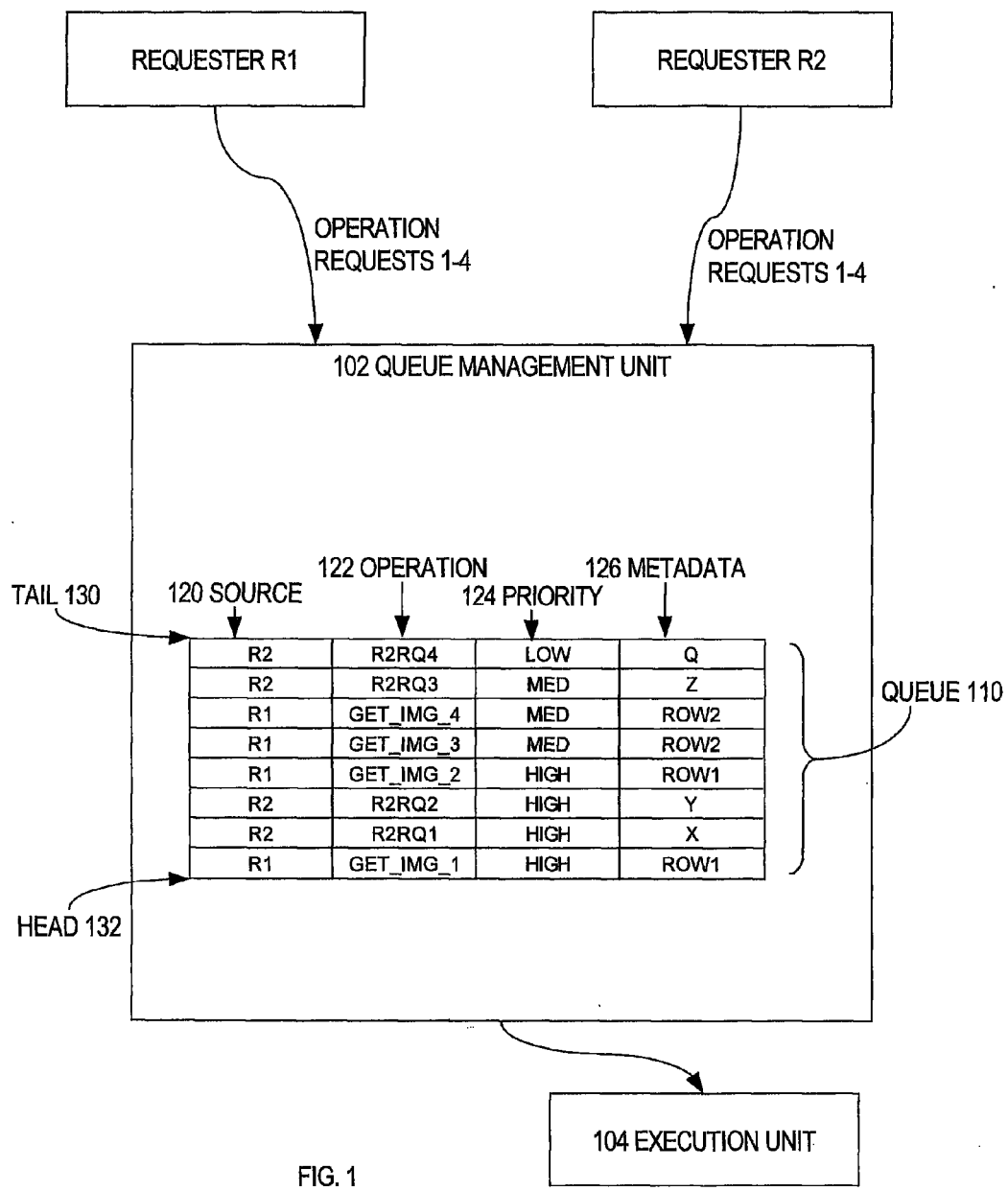
FIG. 1 is a block diagram of a queue management unit according to an embodiment of the invention.

FIG. 1 is a block diagram of a queue management unit 102 that allows dynamic re-prioritization of previously-requested operations, according to an embodiment of the invention. In the embodiment illustrated in FIG. 1, queue management unit 102 has received operation requests from two distinct requesters: requester R1 and requester R2.

Requesters R1 and R2 generally represent any type of computer program that sends operation requests to queue management unit 102. For the purposes of illustration, it shall be assumed that requester R1 is a photo management application that requests the retrieval and display of images, and requester R2 is a file compression application that requests compression operations to be performed on designated files. It should be noted that these are only two examples of computer programs that can send operation requests to queue management unit 102, and that the techniques described herein are not limited to any particular type of requesters.

Returning to FIG. 1, it illustrates the state of queue management unit 102 after requester R1 has submitted four requests, and requester R2 has submitted four requests. The requests from R1, which are identified as GET_IMG_1, GET_IMG_2, GET_IMG_3, and GET_IMG_4 have been placed in the first, fourth, fifth and sixth positions in queue 110, respectively. The requests from R2, which are identified as R2RQ1, R2RQ2, R2RQ3, and R2RQ4 have been placed in the second, third, seventh and eighth positions in queue 110, respectively.

The positions in queue 110 into which the operation requests have been placed were chosen by queue management unit 102 based, at least in part, on the priorities given to those operation requests by the requesters. Specifically, GET_IMG_1 and GET_IMG_2 are closer to the head 132 of queue 110 because requester R1 indicated that those operation requests have high priority, whereas GET_IMG_3 and GET_IMG_4 merely have medium priority. Similarly, R2RQ1 and R2RQ2 are ahead of R2RQ3 and R2RQ4 because R2RQ1 and R2RQ2 have high priority. R2RQ3 is ahead of R2RQ4 because R2RQ3 has medium priority, while R2RQ4 has low priority.

Figure 2:
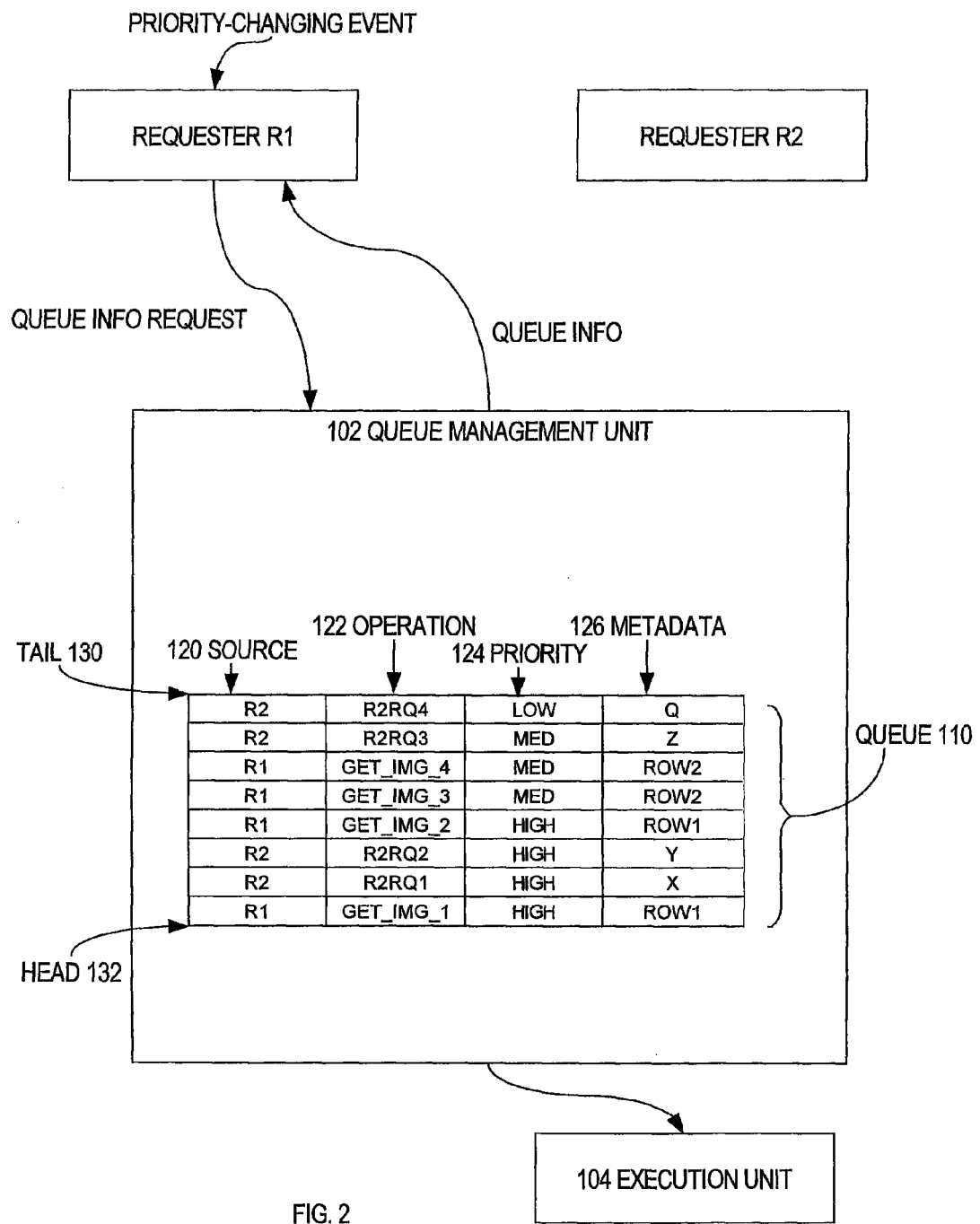
FIG. 2 is a block diagram of a queue management unit receiving a request for queue information from a requester, according to an embodiment of the invention.

In the embodiment illustrated in FIG. 2, each entry within the queue 110 includes a source field 120 that indicates the requester from which the operation request was received, an operation field 122 that indicates the operation that is requested, a priority field 124 that indicates the current priority of the operation request, and a metadata field 126 for storing application-specific metadata, as shall be described in greater detail hereafter.

When resources become available to execute a requested operation, execution unit 104 executes the operation identified in the operation request that is at the head 132 of queue 110. Thus, the sequence of the operation requests within queue 110 generally dictates the sequence in which the corresponding operations will be executed. Consequently, the operation request at the tail 130 of queue 110 corresponds to the operation that will be executed last from among the currently-queued operations.

As mentioned above, queue management unit 102 allows dynamic re-prioritization of operation requests. Dynamic re-prioritization may be triggered, for example, by a priority-changing event, as illustrated in FIG. 2.

Responding to Priority-Changing Events

Referring to FIG. 2, it is a block diagram that illustrates a priority-changing event occurring within requester R1. A priority-changing event is any event that indicates that the priority of already-requested operations may have changed since those priorities were last communicated to queue management unit 102. The nature of priority-changing events will vary from application to application. For example, within a photo management application, priority-changing events may include: the end of a scrolling operation, switching from browsing a collection to the detailed view of a single image (or visa versa), a change in user-specified viewing preferences, a change in the sort order of images, etc.

For the purpose of explanation, assume that GET_IMG_1, GET_IMG_2, GET_IMG_3, and GET_IMG_4 are requests to retrieve and display images 1, 2, 3 and 4, respectively. In the initial operation requests submitted by requester R1 to queue management unit 102, the requests for images 1 and 2 were given high priority, while the requests for images 3 and 4 were given low priority. These initial priorities may have been set by requester R1 because, at the time the operation requests were sent to queue management unit 102, a user was looking at the upper portion of a page that contains images 1, 2, 3 and 4, where images 1 and 2 are on the upper portion and images 3 and 4 are on the lower portion.

Under these circumstances, the priority-changing event may be that the user has scrolled to the lower portion of the page containing images 1, 2, 3, and 4. Because the user has scrolled to the portion of the page that contains images 3 and 4, it is now more important to retrieve and display images 3 and 4 than to retrieve and display images 1 and 2.

According to one embodiment, requesters respond to priority-changing events by sending a queue information request to queue management unit 102. The queue information request is a request for the queue management unit 102 to provide to the requester information about the operations that are currently queued for that requester. For example, the queue information request from requester R1 would request information about operations, previously sent by requester R1, that currently reside in queue 110.

In response to queue information request, queue management unit 102 provides to the requester information about operations from that requester that currently reside in queue 110. For example, queue management unit 102 would respond to the queue information request from requester R1 by providing to requester R1 information about the four operation requests from requester R1 (GET_IMG_1, GET_IMG_2, GET_IMG_3, and GET_IMG_4) that currently reside in queue 110.

In one embodiment, the queue information provided by queue management unit 102 includes (a) data that identifies the requested operation, (b) data that identifies the current priority of the operation, and (c) requester-specific metadata. However, in alternative embodiments, the queue management unit 102 may not store or provide back to the requester either current priority information, requester-specific metadata, or both.

Figure 3:
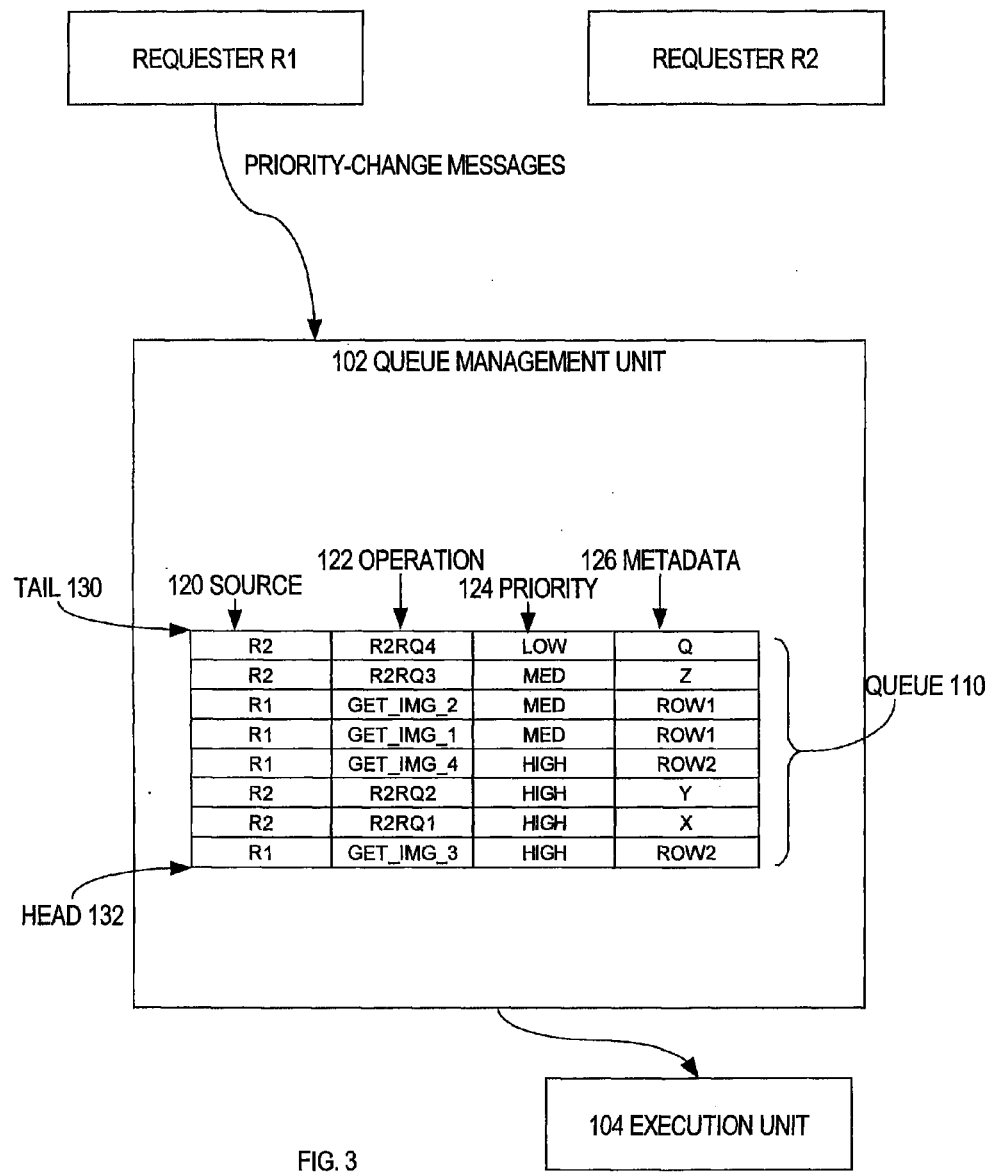
FIG. 3 is a block diagram of a queue management unit in which the priority and order of operation requests have changed in response to priority-change messages, according to an embodiment of the invention.

Upon receiving the queue information, a requester may determine new priorities for the operation requests that are currently in queue 110. As illustrated in FIG. 3.

Priority-Change Messages

Referring to FIG. 3, it is a block diagram illustrating a situation in which requester R1 submits priority-change messages based on (a) the priority-changing event, and (b) the queue information. The priority-change messages indicate new priorities for one or more operations that were indicated in the queue information. The new priorities may or may not be the same as the previously-specified priorities for those operations. In the example illustrated in FIG. 3, the priority-change messages specify the same image retrieval operations as the original operation requests GET_IMG_1, GET_IMG_2, GET_IMG_3 and GET_IMG_4. However, the new priorities of GET_IMG_1, GET_IMG_2, GET_IMG_3 and GET_IMG_4 are respectively medium, medium, high and high. Requester R1 may have chosen these new priorities, for example, because the user scrolled to the lower portion of the page that contains images 1, 2, 3 and 4.

Upon receiving the priority-change messages having the new priorities, the queue management unit 102 selects where to the corresponding operations should be located within the queue 110 based on the new priorities. In some cases, the queue management unit 102 may determine that an operation should stay at its current location within the queue 110. In other cases, the queue management unit 102 may determine that an operation should be changed to a different location within the queue 110. Typically, if the new priorities differ from the previously-specified priorities for the same operations, one or more of the operations will be changed to a new position within the queue 110.

In the embodiment illustrated in FIG. 3, the operation requests of requester R1 have been re-ordered within the queue 110 based on the new priorities without affecting the position of the operation requests of any other requester (e.g. requester R2). Specifically, the operation requests from requester R1 continue to occupy the first, fourth, fifth and sixth positions within queue 110, and the operation requests from requester R2 continue to occupy the second, third, seventh and eighth positions within queue 110. However, the order of GET_IMG_1, GET_IMG_2, GET_IMG_3 and GET_IMG_4 within the queue 110 has been changed to GET_IMG_3, GET_IMG_4, GET_IMG_1 and GET_IMG_2.

While FIG. 3 illustrates an embodiment in which the re-prioritization of operations from one requester do not affect the queue positions of queued operations from other requesters, in an alternative embodiment the re-prioritization of operations from one requester may affect the queue position of operations from other requesters. For example, if queue management unit 102 is configured with logic to place high priority operations from all requesters ahead of medium priority operations from all requesters, then the changing a particular high-priority operation to a medium-priority operation may cause all high-priority operations (including those from other requesters) that were queued behind that particular operation to move ahead in the queue 110. Similarly, changing a particular medium-priority operation to a high-priority operation may cause all medium-priority operations that were ahead of that particular operation to move back in the queue 110.

Priority-Change Polling

In the embodiment illustrated in FIGS. 1-3, queue information is sent from queue management unit 102 in response to a queue information request from requester R1, which in turn was sent in response to a priority-changing event that occurred in requester R1. However, in an alternative embodiment, queue management unit 102 is configured to periodically poll the requesters that have operation requests in queue 110. The polling may be performed at predetermined intervals. At the end of each interval, queue management unit 102 may proactively send queue information to each of the requesters. Those requesters may respond by indicating that priorities have not changed, or by indicating a change in priorities. In embodiments that perform polling, the intervals at which requesters are polled may be the same for all requesters, or may vary from requester to requester.

Priority-Change Messages

Alternatives

In the example given above, the priority-change messages sent by requester R1 specify new priorities for all of the operation requests that were included in the queue information received by requester R1. However, in alternative embodiment, the priority-change messages may only include new priorities for those operations for which the priority has been changed. For example, assume that the priority-changing event is that the user of the photo management software requested a detailed view of image 1. Under these circumstances, the retrieval of image 1 would remain high priority, but the retrieval of priority image 2 may be lowered to medium. In an embodiment where the priority-change messages include new priorities for only those operations whose priorities have changed, the only new priority that would be included in the priority-change message would be GET_IMG_2, whose priority would be changed from high to medium. This change might not affect the ordering of queue 110 at all, since there were no high priority requests from R1 that followed GET_IMG_2 within queue 110.

In one embodiment, the priority-change messages may also include requests for operations that were not previously in the queue 110. For example, assume that the priority-changing event is the user switching to a different page that includes images 5 and 6. The priority-change messages produced by requester R1 in response to this event may (a) specify "cancel" as the new priority for GET_IMG_1, GET_IMG_2, GET_IMG_3 and GET_IMG_4, and (b) include new high priority operation requests GET_IMG_5 and GET_IMG_6 for requesting images 5 and 6.

In response to priority-change messages that cancel GET_IMG_1, GET_IMG_2, GET_IMG_3 and GET_IMG_4, and add new operation requests GET_IMG_5 and GET_IMG_6, queue management unit 102 may replace GET_IMG_1 and GET_IMG_2 with the high-priority GET_IMG_5 and GET_IMG_6 requests in the first and third positions of queue 110, and remove GET_IMG_3 and GET_IMG_4 from the queue 110.

Queue Management Unit Implementation

Queue management unit 102 may be implemented in a variety of ways and contexts. For example, queue management unit 102 may be implemented within the operating system of a device. In such an environment, queue 110 may include operation requests from multiple applications running on the device.

Alternatively, queue management unit 102 may be implemented in a shared library, were various applications may link to the library code in order to invoke routines within the library that provide the functionality of queue management unit 102. In such an embodiment, queue 110 may include operation requests from the one or more applications that have linked to the same instance of those routines.

In yet another embodiment, queue management unit 102 may simply be code, within a single application, for managing operations that need to be performed by that application. In such an embodiment, queue 110 would not contain operation requests of applications other than that single application.

Metadata Tags

In the embodiment illustrated in FIGS. 1-3, each entry of queue 110 has a metadata field 126. Metadata field 126 is a space for requesters to store "tags" that the requesters want returned to them when the requesters send queue information requests. In one embodiment, requesters use the metadata field 126 to store tags that will help the requesters determine the correct priorities after a priority-changing event.

For example, assume that requester R1 has requested the retrieval and display of 100 images from a collection. Assume further that requester R1 is running on a device that can only display one row at a time, and that each row includes two images. Under these circumstances, requester R1 may include row-number metadata with each of the 100 operation requests. Specifically, the operation requests for the first and second images will indicate row 1, operation requests for the third and fourth images will indicate row 2, etc. In the example illustrated in FIG. 1, the metadata field 126 includes row information for each of the operation requests from requester R1.

According to one embodiment, whatever metadata is supplied by a requester in its operation requests is provided back to the requester in response to queue information requests. For example, in the case where requester R1 includes row-number metadata in the operation requests, the queue information returned to requester R1 includes the row-number metadata. This metadata may then be used by requester R1 to determine how to change the priorities of the already-queued operation requests. For example, in the case where the priority-changing event is that a user has scrolled to the twentieth row in an image collection, requester R1 may quickly identify the operation requests that indicate row 20, and set the priority of those requests to high, and the priority of the remaining operation requests to medium. These priority-change messages may then be sent back to queue management unit 102.

Row number is merely one example of the type of metadata that a requester may cause queue management unit 102 to store in metadata field 126. Any type of information that a requester might use during a reprioritization process may be stored in metadata field 126. For example, the operations requested by a music application may involve retrieving songs, and the metadata may indicate the genre of the song. In response to a user changing his or her genre preferences, the music application may want to re-prioritize the retrieval operations based on the genre of the songs being requested. The re-prioritization for the music application will be significantly simpler because the queue information received by the music application would include, for each previously-issued operation request, the genre to which the requested song belongs.

Other examples of metadata that may be passed to the queue management unit 102 with operation requests, and passed back to requestors with the queue information, include but are not limited to: the type of the item involved in the operation (e.g. file type), the owner of the item involved in the operation, the identity of the user that requested the operation, the coordinates of the item involved in the operation, the estimated time required to perform the operation, etc.

Operational Example

Figure 4:
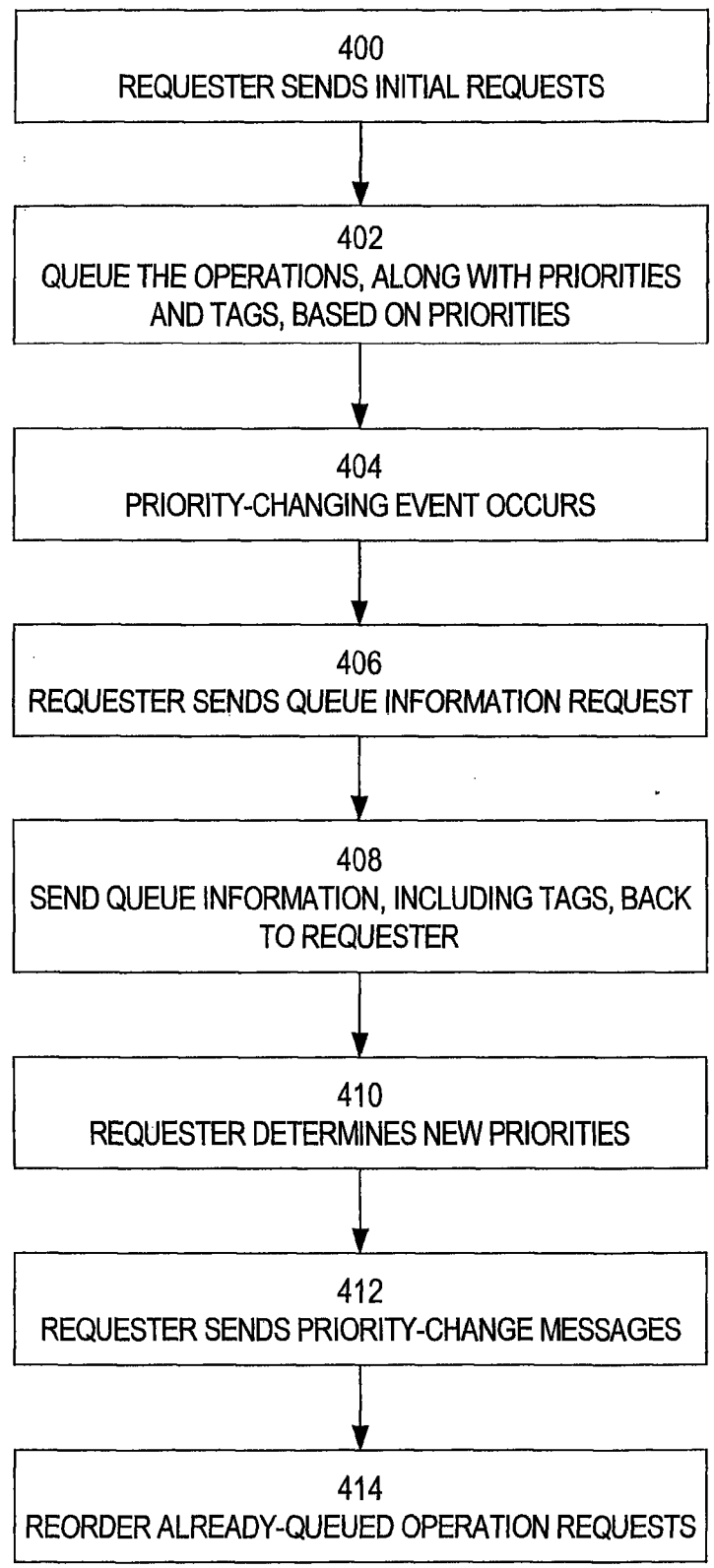
FIG. 4 is a flowchart illustrating an example of a dynamic priority change for already queued operations.

FIG. 4 is a flowchart illustrating dynamic re-prioritization of already-queued operations according to an embodiment of the invention. For the purpose of explanation, it shall be assumed that the requester is a photo management application, and that the application supports four levels of priority (cancel, low, normal, high). At step 400, the photo management application (the "requester") sends an initial set of operation requests. For the purpose of explanation, it will be assumed that the initial operation requests are in response to a user requesting to view a gallery of 100 images, where the device on which the images are to be displayed is only able to display two rows of two images at any given time.

Under these circumstances, the initial requests may indicate normal priority for the first four images, and low priority for the remaining 96 images. Further, because the row of an image determines how important it is for the image to be retrieved, the operation requests include tags that indicate the row of the image that corresponds to the request.

In response to the initial requests, the queue management unit queues the operations, along with the priorities and tags, at positions that are based on the priorities. In the present example, the queue management unit would queue the operations to retrieve the first four images ahead of the operations to retrieve the remaining 96 images.

Assume that, after the device has finished the retrieval of the first ten images, a priority-changing event occurs (step 404). The priority-changing event may be that the user of the photo management application has scrolled to the twentieth row in the gallery. In response to detecting occurrence of the priority-changing event, the photo management software sends a queue information request (step 406). In response to the queue information request, the queue management unit sends information about the to-be-executed operations that the photo management application currently has in the queue (step 408). In the present example, the queue management unit would return queue information that identified the 90 not-yet-executed image retrieval operations, each of which would also be accompanied by the row number of the image to which the request corresponds.

Based on the queue information, the photo management application determines new priorities for the not-yet-executed operations (step 410). In the present example, the photo management application would use the row number metadata that accompanies the operation requests to identify the operation requests for the images in rows 20 and 21, and change the priorities of those operation requests to normal.

After the new priorities have been determined by the photo management application, the priority-change messages are sent to the queue management unit (step 412), which responds to the priority-change messages by changing the position of the to-be-executed operations within with queue (step 414). In the present example, the queue management unit would move the retrieval operations for the images in rows 20 and 21 ahead of all other retrieval requests of the photo management application.

While examples have been described in which operation requests, queue information, and priority-change messages, are sent in batches, in alternative embodiments this information is transmitted one request at a time. For example, in response to a queue information request from a requester, the queue management unit may send the requester information about one of the requester's queued operations. The requestor may then determine whether the priority of that particular operation should be changed, and send the new priority (which may or may not be the same as the previous priority) back to the queue management unit. The queue management unit may make queue position adjustments, as necessary, and then send information about the next queued operation of that requester back to the requester. The requester determines the appropriate priority for that operation request, and sends the new priority to the queue management unit. This process may then be repeated until the requestor has specified new priorities for each of the already-queued operations of that requester.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
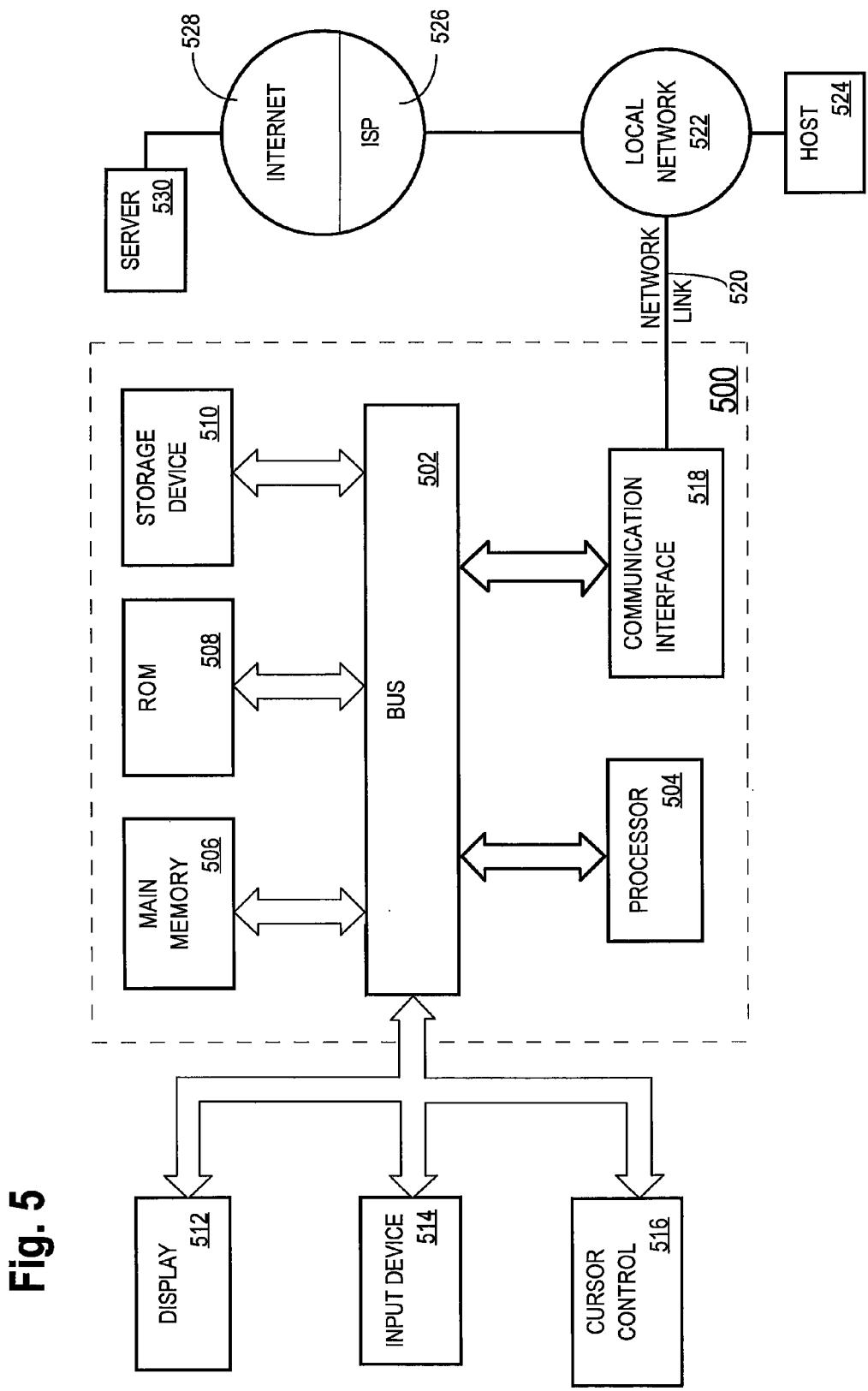
FIG. 5 is a block diagram of a system upon which embodiments of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense.

What is claimed is:

1. A method for scheduling operations, comprising:
   maintaining a queue of to-be-executed operations, wherein the to-be-executed operations are executed in an order based on relative positions of the to-be-executed operations within the queue;
   receiving, from an operation requester, one or more first requests for execution of a plurality of operations;
   in response to the one or more first requests, placing the plurality of operations in a corresponding first plurality of positions within the queue;
   after the plurality of operations have been placed in the queue and before receiving one or more priority-change messages for the plurality of operations, providing, to the operation requester, information about operations, within the queue, that have been requested by the operation requester;
   wherein providing the information includes providing, to the operation requester, a current priority designation for each of the plurality of operations;
   after the plurality of operations have been placed in the queue and before the plurality of operations have been executed, receiving, from the operation requester, the one or more priority-change messages for the plurality of operations;
   wherein each operation of the plurality of operations has a second priority designation specified by the operation requester in the one or more priority-change messages;
   wherein, for at least one operation of the plurality of operations, the second priority designation is different than an initial priority designation;
   in response to the one or more priority-change messages that indicate a different priority for the at least one operation, changing the position, within the queue, of said least one operation;
   wherein the method is performed by one or more computing devices.

2. The method of claim 1, wherein providing the information to the operation requester is performed in response to a request from the operation requester.

3. The method of claim 1, wherein providing the information to the operation requester is performed in response to the end of an interval of time.

4. The method of claim 1, wherein: the one or more first requests include metadata associated with the plurality of operations; and the step of providing the information to the operation requester includes providing the metadata to the operation requester.

5. The method of claim 4 wherein the metadata associated with each operation request includes information used by the operation requestor to determine the second priority designation for the operation request.

6. The method of claim 1 wherein:
   the queue includes operations requested by one or more other requestors, and more operations of said requestor are ahead of a particular queued operation of another requestor than were ahead of the particular queued operation prior to changing the position of said at least one operation.

7. The method of claim 1 wherein the queue is maintained by an operating system of a device, and queues operations requested by applications running on the device.

8. The method of claim 1 wherein the queue is maintained by routines in a shared library, and queues operations requested by a plurality of applications that are sharing said shared library.

9. The method of claim 8 further comprising:
   the operation requestor including tags with the first one or more requests;
   after sending the one or more first requests, and before sending the one or more priority-change messages, the operation requestor performing the steps of:
   detecting a priority-changing event;
   in response to detecting the priority-changing event, sending a queue information request to the queue management unit;
   receiving, as a response to the queue information request, information about operations currently queued by the queue management unit for the operation requester;
   wherein the information includes tags associated with the operations that are currently queued; and
   determining the second priority designations based, at least in part, on the tags.

10. A non-transitory computer-readable storage storing instructions for scheduling operations, said instructions including instructions which, when executed by one or more processors, cause:
  maintaining a queue of to-be-executed operations, wherein the to-be-executed operations are executed in an order based on relative positions of the to-be-executed operations within the queue;
  receiving, from an operation requester, one or more first requests for execution of a plurality of operations;
  in response to the one or more first requests, placing the plurality of operations in a corresponding first plurality of positions within the queue;
  after the plurality of operations have been placed in the queue and before receiving one or more priority-change messages for the plurality of operations, providing, to the operation requester, information about operations, within the queue, that have been requested by the operation requester;
  wherein providing the information includes providing, to the operation requestor, a current priority designation for each of the plurality of operations;
  after the plurality of operations have been placed in the queue and before the plurality of operations have been executed, receiving, from the operation requester, one or more priority-change messages for the plurality of operations;
  wherein each operation of the plurality of operations has a second priority designation specified by the operation requester in the one or more priority-change messages;
  wherein, for at least one operation of the plurality of operations, the second priority designation is different than an initial priority designation;
  in response to the one or more priority-change messages that indicate a different priority for the at least one operation, changing the position, within the queue, of said least one operation;
  wherein the method is performed by one or more computing devices.

11. The non-transitory computer-readable storage of claim 10 wherein providing the information to the operation requester is performed in response to a request from the operation requester.

12. The non-transitory computer-readable storage of claim 10 wherein providing the information to the operation requester is performed in response to the end of an interval of time.

13. The non-transitory computer-readable storage of claim 10 wherein:
  the one or more first requests include metadata associated with the plurality of operations; and
  the step of providing the information to the operation requester includes providing the metadata to the operation requester.

14. The non-transitory computer-readable storage of claim 13 wherein the metadata associated with each operation request includes information used by the operation requestor to determine the second priority designation for the operation request.

15. The non-transitory computer-readable storage of claim 10 wherein:
  the queue includes operations requested by one or more other requestors, and more operations of said requestor are ahead of a particular queued operation of another requestor than were ahead of the particular queued operation prior to changing the position of said at least one operation.

16. A system comprising:
  one or more processors; and
  a non-transitory computer-readable medium storing instructions executable by the one or more processors to perform operations comprising:
    maintaining a queue of to-be-executed operations, wherein the to-be-executed operations are executed in an order based on relative positions of the to-be-executed operations within the queue;
    receiving, from an operation requester, one or more first requests for execution of a plurality of operations;
    in response to the one or more first requests, placing the plurality of operations in a corresponding first plurality of positions within the queue;
    after the plurality of operations have been placed in the queue and before receiving one or more priority-change messages for the plurality of operations, providing, to the operation requester, information about operations, within the queue, that have been requested by the operation requester;
    wherein providing the information includes providing, to the operation requester, a current priority designation for each of the plurality of operations;
    after the plurality of operations have been placed in the queue and before the plurality of operations have been executed, receiving, from the operation requester, the one or more priority-change messages for the plurality of operations;
    wherein each operation of the plurality of operations has a second priority designation specified by the operation requester in the one or more priority-change messages;
    wherein, for at least one operation of the plurality of operations, the second priority designation is different than an initial priority designation; and
    in response to the one or more priority-change messages that indicate a different priority for the at least one operation, changing the position, within the queue, of said least one operation.

17. The system of claim 16, wherein providing the information to the operation requester is performed in response to a request from the operation requester.

18. The system of claim 16, wherein providing the information to the operation requester is performed in response to the end of an interval of time.

19. The system of claim 16, wherein:
  the one or more first requests include metadata associated with the plurality of operations; and
  the step of providing the information to the operation requester includes providing the metadata to the operation requester.

20. The system of claim 19 wherein the metadata associated with each operation request includes information used by the operation requestor to determine the second priority designation for the operation request.

21. The system of claim 16 wherein: the queue includes operations requested by one or more other requestors, and more operations of said requestor are ahead of a particular queued operation of another requestor than were ahead of the particular queued operation prior to changing the position of said at least one operation.

22. The system of claim 16 wherein the queue is maintained by an operating system of a device, and queues operations requested by applications running on the device.

23. The system of claim 16 wherein the queue is maintained by routines in a shared library, and queues operations requested by a plurality of applications that are sharing said shared library.

24. The system of claim 23 further comprising:
the operation requestor including tags with the first one or more requests;
after sending the one or more first requests, and before sending the one or more priority-change messages, the operation requestor performing the steps of:
detecting a priority-changing event;
in response to detecting the priority-changing event, sending a queue information request to the queue management unit;
receiving, as a response to the queue information request, information about operations currently queued by the queue management unit for the operation requester;
wherein the information includes tags associated with the operations that are currently queued; and
determining the second priority designations based, at least in part, on the tags.

* * * * *